US007001875B2

(12) United States Patent
Requejo

(10) Patent No.: US 7,001,875 B2
(45) Date of Patent: Feb. 21, 2006

(54) DUAL COLORANTS

(75) Inventor: Luz P. Requejo, Racine, WI (US)

(73) Assignee: S.C.Johnson & Son, Inc., Racine, WI (US)

( * ) Notice: Subject to any disclaimer, the term of this patent is extended or adjusted under 35 U.S.C. 154(b) by 153 days.

(21) Appl. No.: 10/301,288

(22) Filed: Nov. 21, 2002

(65) Prior Publication Data

US 2004/0102343 A1  May 27, 2004

(51) Int. Cl.
  *C11D 17/00* (2006.01)
  *C09B 67/02* (2006.01)
(52) U.S. Cl. ............... 510/191; 510/192; 510/446; 8/525; 8/526; 8/638
(58) Field of Classification Search ............ 510/191, 510/192, 446; 8/525, 526, 638
See application file for complete search history.

(56) References Cited

U.S. PATENT DOCUMENTS

| | | | | |
|---|---|---|---|---|
| 3,735,131 A | * | 5/1973 | Sherwin ............ 250/302 |
| 4,082,682 A | * | 4/1978 | Inamorato et al. ....... 510/324 |
| 4,144,024 A | | 3/1979 | Lala |
| 4,149,986 A | | 4/1979 | Dickson |
| 4,249,274 A | | 2/1981 | Kitko |
| 4,308,625 A | | 1/1982 | Kitko |
| 4,522,738 A | * | 6/1985 | Magid et al. ............ 510/100 |
| 5,031,253 A | | 7/1991 | Brendlinger |
| 5,041,421 A | | 8/1991 | King |
| 5,114,647 A | | 5/1992 | Levesque et al. |
| 5,443,656 A | | 8/1995 | Burrows et al. |
| 5,578,562 A | | 11/1996 | Lockhart |
| 5,718,729 A | | 2/1998 | Harris |
| 5,726,145 A | | 3/1998 | Julemont et al. |
| 5,885,949 A | | 3/1999 | Stamm |
| 5,888,544 A | | 3/1999 | Gergely et al. |
| 5,958,334 A | | 9/1999 | Haddon |
| 6,001,789 A | | 12/1999 | Trinh et al. |
| 6,057,281 A | | 5/2000 | Stamm |
| 6,063,390 A | | 5/2000 | Farrell et al. |
| 6,121,215 A | | 9/2000 | Rau |
| 6,180,092 B1 | | 1/2001 | Lagin |
| 6,197,338 B1 | | 3/2001 | Nürnberg et al. |
| 6,255,267 B1 | | 7/2001 | Nayar et al. |
| 6,290,936 B1 | | 9/2001 | Ross et al. |
| 6,355,607 B1 | | 3/2002 | Rahman et al. |
| 6,387,321 B1 | | 5/2002 | McGill |
| 2002/0061831 A1 | | 5/2002 | Kaziska et al. |
| 2002/0132746 A1 | | 9/2002 | Desenna et al. |

FOREIGN PATENT DOCUMENTS

| | | |
|---|---|---|
| EP | 1 035 198 A2 | 9/2000 |
| GB | 200370 | 7/1923 |
| JP | 62205018 A | 9/1987 |
| WO | WO 96/04362 | 2/1996 |
| WO | WO 00/26334 | 5/2000 |

OTHER PUBLICATIONS

Budavari S Ed—Budavari S: "The Merck Index, 11th Edition" 1989, Merck Index. Encyclopedia of Chemicals, Drugs, and Biologicals, Rahway, Merck & Co, US, XP00227876 pp. 209.
J. C. Bailar et al.: "Comprehensive Inorganic Chemistry" 1975, Pergamon Press, Oxford, XP002291576 cf. Cobalt chloride, -bromide, -iodide p. 1070-p. 1071.
Database WPI Week 197652 Derwent Publications Ltd., London, GB; AN 1976-96722X. XP002291577 Powdered colouring agent for bath water-prepd. by dissolving flourescein salt . . . Aug. 1976.
Ceulemans J et al: "Evaluation of a mucoadhesive tablet for ocular use" Journal of Controlled Release, Elsevier Science Publishers B.V. Amsterdam, NL vol. 77, No. 3 . . . .
Susan Budavari: "The Merck Index 12th ed." 1996, Merck & Co., Inc., NJ, XP002294590 Ref. Nos. 109, 110 p. 19.
Susan Budavarai: "The Merck Index 12th ed." 1996, Merck & Co., Inc., NJ XP002294591 Ref. Nos. 1397, 1938 p. 225.
Susan Budavarai: "The Merck Index 12th ed." 1996, Merck & Co., Inc., NJ XP002294592 Ref. Nos. 1407 p. 236.
Susan Budavarai: "The Merck Index 12th ed." 1996, Merck & Co., Inc., NJ XP002294593 Ref. Nos. 1469 p. 236.
Susan Budavarai: "The Merck Index 12th ed." 1996, Merck & Co., Inc., NJ XP002294594 Ref. Nos. 4194 p. 705.

* cited by examiner

*Primary Examiner*—Margaret Einsmann

(57) ABSTRACT

Dual colorants are disclosed. The colorants of the present invention include at least one compound, which exhibits a first color outside an aqueous environment and a second color after placement into an aqueous environment. In some cases, the colorant includes an oil-soluble dye capable of exhibiting the first color and a water-soluble dye capable of exhibiting the second color. In certain embodiments, such colorants may be used in toilets. In these embodiments, the first color corresponds to a color associated with a fragrance, such as red for rose, while the second color corresponds to a color associated with cleanliness in a toilet, such as blue or green.

23 Claims, No Drawings

DUAL COLORANTS

FIELD OF THE INVENTION

This invention relates generally to colorants, and more particularly to colorants useful in toilets.

SUMMARY OF THE INVENTION

Colorants and methods for making and using colorants are disclosed.

In one embodiment, the colorant of the present invention is capable of being inserted into an aqueous environment. The colorant includes an oil-soluble dye capable of exhibiting a first color and a water-soluble dye capable of exhibiting a second color. The colorant exhibits the first color before insertion into an aqueous environment, and the first color and at least a portion of the aqueous environment are capable of changing into the second color after insertion into the aqueous environment.

In another embodiment, a method for coloring an aqueous environment comprises providing a composition comprising at least one compound, wherein the composition exhibits a first color outside an aqueous environment, and placing the composition into an aqueous environment, wherein the first color and at least a portion of the aqueous environment change into a second color after placement into the aqueous environment.

In yet another embodiment, a method for making a colorant comprises providing an oil-soluble dye capable of exhibiting a first color, providing a water-soluble dye capable of exhibiting a second color, and mixing the oil-soluble dye and the water-soluble dye.

DETAILED DESCRIPTION

The colorants of the present invention are capable of exhibiting at least two colors. These colorants are useful in any aqueous environment, and are capable of exhibiting a first color in non-aqueous form and a second color when exposed to an aqueous environment. In one aspect, the colorants are also capable of coloring at least a portion of the aqueous environment itself with the second color.

In another aspect, the colorants of the present invention are useful in toilets. Many toilet cleanser manufacturers incorporate fragrances into their toilet products. Under these circumstances, it is pleasing to the consumer that the color of the toilet product match the type of fragrance being employed. After insertion into a toilet, however, consumers are accustomed to seeing the product (and their toilet water) exhibit shades of blue or green, since these colors are associated with cleansing properties.

Thus, in certain embodiments of the present invention, the colorant exhibits a first color before insertion into an aqueous environment and a second color after introduction into the aqueous environment. When these embodiments are employed in toilets, the colorant is capable of exhibiting a first color to indicate the type of fragrance incorporated into the toilet product being sold (e.g. yellow for lemon, orange for citrus, pink or red for roses, purple or lavender for lilacs, etc.), and a second color after insertion into the toilet—typically blue or green—which consumers associate with cleanliness.

In other embodiments, colorants of the present invention comprise both an oil-soluble dye and a water-soluble dye. In these embodiments, the oil-soluble dye is capable of exhibiting the first color (outside the aqueous environment), while the water-soluble dye is capable of exhibiting the second color (inside the aqueous environment).

The oil-soluble dye used in these embodiments may be added in an amount between about 0.01% and 0.2% by weight of the colorant. Examples of suitable oil-soluble dyes include, but are not limited to, Nitro Fast Red A 4B®, solvent yellow 72, Sandoplast Yellow 3G®, Sandoplast Green G®, and HS-400 Sandoplast Red Violet®.

Through use of a combination of two or more of the above-identified oil-soluble dyes, certain other colors, such as orange, may be employed as the first color. For example, a mixture of the oil-soluble dyes Nitro Fast Red A 4B® and solvent yellow 72 yields orange as the first color.

To adjust the shade of the first color, the concentration range for the oil-soluble dye may be manipulated. When relatively light first colors are desired, the lower end of the concentration range for the oil-soluble dye may be employed. For example, small amounts of Nitro Fast Red A 4B® and HS-400 Sandoplast Red Violet®(e.g. between about 0.01% to 0.08%) yield pink and lavender as first colors respectively. When relatively dark first colors are desired, the higher end of the concentration range for the oil-soluble dye may be employed. For example, adding 0.2% Nitro Fast Red A 4B® yields deep red as the first color.

The water-soluble dye of these embodiments may be added in an amount between about 0.01% and 0.3% by weight of the colorant. Examples of suitable water-soluble dyes include acid blue #9, Basacid Blue NB 755® and D&C green #8.

It should be noted that if either the water-soluble or oil-soluble dye contains water of hydration, the water of hydration may activate the water-soluble dye before insertion into an aqueous environment, thereby changing the first color into either a combination of the first color and the second color or into the second color entirely. The presence of relatively small amounts water of hydration is not necessarily undesirable, since, similar to the combination of oil-soluble dyes described above, it can be used to manipulate the first color. For example, if an oil-soluble dye exhibits red and a water-soluble dye exhibits blue, the presence of water of hydration may yield purple as the first color before insertion into an aqueous environment. If too much water of hydration is present, however, the first color will prematurely change entirely into the second color.

Colorants according to the above-referenced embodiments may not only include the oil-soluble and water-soluble dyes described herein, but may optionally include other components.

For instance, the colorant may also comprise a composition containing one or more compounds capable of effervescence in liquid environments. The term "effervescence" as defined herein, means capable of forming bubbles. In certain illustrative embodiments, the presence of these bubbles results from the formation of carbon dioxide. When added to water, a mixture of at least one acid and at least one salt results in a chemical reaction capable of liberating carbon dioxide.

Examples of acids suitable for use in these illustrative embodiments include, but are not limited to, tartaric acid, citric acid, fumaric acid, adipic acid, malic acid, oxalic acid, or sulfamic acid, either alone or in combination. Typically, these embodiments are prepared from citric acid or a combination of citric acid and tartaric acid. Use of citric acid alone may cause difficulties during the manufacturing process. For example, use of citric acid alone may result in a sticky mixture that is difficult to granulate.

Examples of salts suitable for use in illustrative embodiments include, but are not limited to, the alkali metal salts. Sodium carbonate, calcium carbonate, magnesium carbonate, ammonium carbonate, potassium carbonate, sodium bicarbonate, and calcium bicarbonate may all be employed.

In other embodiments, the selection of specific acids and/or salts and their proportions depends, at least in part, upon the requirements for the amount of carbon dioxide release. In some embodiments, the acid may be added in an amount of about 10% to about 60% by weight of the colorant, while the salt may also be added in an amount of about 10% to 60% by weight of the colorant.

The colorant may further include a non-hygroscopic solvent, which may be added in an amount between about up to 1.5% by weight of the colorant. The term non-hygroscopic solvent is defined herein as any compound that does not take up moisture from the environment. Since the non-hygroscopic solvent does not absorb moisture from the environment, it is unlikely that activation of the water-soluble dye will occur prior to contact with an aqueous environment. In addition, with embodiments of the present invention that employ an effervescent component, the formation of bubbles should be substantially avoided until the colorant comes into contact with a liquid, such as water. That is, moisture from the environment does not precipitate a premature reaction between the acid and salt of the effervescent, before these chemical constituents come into contact with liquids.

In certain embodiments, the non-hygroscopic solvent is capable of dissolving or dispersing at least a small amount of one or more other substances. Such non-hygroscopic solvents include, but are not limited to diethyl phthalate, isopropyl myristate, isopropyl palmitate and at least some species of ester solvents, such as dioctyl adipate and butyl stearate. Hygroscopic solvents may also be employed.

In certain other embodiments, the non-hygroscopic solvent may be non-aqueous or non-polar (aprotic). With respect to the non-aqueous aspect, the absence of water from the colorant avoids color changes in the product before insertion into an aqueous environment as well as premature formation of bubbles in embodiments containing an effervescent. Regarding the absence of polarity, this feature avoids dissociation of the salt component in embodiments containing an effervescent, to prevent a premature reaction between the acid and carbonate or bicarbonate components of the effervescent.

In still other embodiments, the colorant further includes a fragrance and/or perfume. In embodiments that contain an effervescent component, the fragrance may be released into the atmosphere through formation of carbon dioxide. The fragrance is typically present in an amount of up to about 6% by weight of the colorant.

Any known fragrance and/or perfume may be employed. Such fragrances include, but are not limited to, Allspice, Balsam, Bouquet, Christmas Pine, Citronella, Citrus Fresh, Citrus 7305 & 7309, Clean & Fresh, Cove, Deodorizer, Earth & Sea, Eucalyptus, Evergreen, any of the Floral series (3788, 9451, 8444, 4788, 9436 & 9940), Fresh & Clean 7902 & 8003, Fresh Outdoors, Gardenia, any of the Herbal series (8916, 4555, 8144 & 3719), Honeysuckle, Jasmine, any of the Lemon series (6001, 6039, 8136, 9413 & 9414), any of the Odor Mask series (5211, 6794, 7851, 8833, 8836, 8838, 8839, 8899 & 8899 w/s), any of the Pine series (9434, 8329 & 9435), Rose (9297 & 9298), Sandalwood, Sea Breeze, Spring Clean and Spring Rain, all available from The Good Scents Company, Atlanta, Ga.

Other fragrances and/or perfumes useful in the practice of the invention include the fragrances commonly used in the household and industrial cleaning and sanitizing industry. These fragrances may be found in the catalog Flavors & Fragrances, and are available from the Aldrich Chemical Company, Inc., Milwaukee, Wis. Those of particular interest are Alpha Pinene, Alpha Terpineol, Beta Pinene, Cedar Leaf, Citral, Citronellal W23070-7, Coumarin, Diethylphthalate, Eucolyptol, Eugenol, Heptyl Isobutyrate, Trans-2-Hexene-Diol, Isobomyl and 3,5,5-Trimehtylhexanal.

Often, but not always, the fragrance contains the solvent. As those of skill will appreciate, fragrances typically comprise highly concentrated solid ingredients. The presence of the solvent may be necessary to dissolve, disperse or mix these solid ingredients to make the fragrance homogenous throughout the colorant. Since fragrance manufacturers often incorporate solvents directly into their fragrances, coordinating solvent selection with each fragrance manufacturer may be necessary.

In addition, the colorant may further include a surfactant. A surfactant is any substance capable of reducing surface tension, no matter how slight, between two phases. The surfactant is typically added in anhydrous form and should be present at levels ranging from about 0.25% to about 10% by weight of the colorant. In some embodiments, the surfactant imparts a detergent effect to the effervescent.

Surfactants useful in the colorant of the present invention include anionic, non-ionic, cationic, amphoteric and zwitterionic surfactants. Anionic surfactants are particularly useful, since such surfactants are capable of forming a thick foam or lather during liberation of carbon dioxide by embodiments containing the effervescent.

Examples of suitable surfactants include, but are not limited to sodium lauryl sulfate, alpha olefin sulfonate, linear alkyl benzene sulphonate and cocoyl glutamic acid. Other types of surfactants include alkyl benzene sulfonates, alkyl ether sulfates, paraffin, sulfonates, olefin sulfonates, amine oxides, alkyl betaines and the like, which are known in the art. Commercial sources of such surfactants may be found in McCutcheon's Emulsifiers and Detergents, North American Edition, 1987, McCutcheon Division, (MC Publishing Company).

An absorbing agent may also be employed, in an amount of about 0.1% to about 10% by weight of the colorant. The absorbing agent is useful for taking up water or moisture that may come into contact with the colorant, thereby preventing a premature color change and/or reaction between the acid and carbonate/bicarbonate components of the effervescent, when present.

The absorbing agent is typically a compound comprising silica (silicon dioxide). Examples of such absorbing agents, include but are not limited to, amorphous silica, foamed silica and synthetic silica.

In other aspects, the invention involves methods of making the effervescent described herein. In illustrative embodiments, the colorant may be prepared by a batching procedure in a V-blender, ribbon blender, Forber Blender or other mixing implement known to those of skill in the art. The ribbon blender and the Forber Blender require relatively shorter mixing times.

In one embodiment, an oil-soluble dye is first dissolved in a fragrance. After complete dissolution, the mixture is uniformly blended with a salt in a blender. The remaining components may be introduced into the formula, with homogeneous mixing before the addition of each raw material. If desired, a surfactant may be added first. Next, citric acid may be added, followed by a flowing or absorbing agent.

Finally, the water-soluble dye may be introduced into the system. Although the foregoing embodiment is characterized by a specific order of addition, the method of making the colorant of the present invention should not be considered as limited thereto.

External conditions, such as temperature and humidity, may be monitored throughout the process of making the colorant. Ideally, manufacture of the effervescent is carried out at temperatures between about 20° C. and 30° C., but fluctuation in temperatures will not affect the quality of the colorant. Relative humidity should typically not exceed 25%, as the absorption of moisture from the environment may activate the water-soluble dye, resulting in a premature color change from the first color to the second color.

The method of making described above usually yields the colorant of the present invention in powder form. The colorant may, however, be supplied in various other forms, such as tablet form, block form, cake form, capsule form, and any other form known to those of skill in the art. To make tablet, block or cake forms, the powder form may be compressed by methods known to those of skill in the art. Size and hardness are dependent on the mold size and pressure used during the compression process. If a liquid form is desired, in some cases it is necessary to employ a dual bottle with two compartments to separate oil-soluble dye from water-soluble dye and to separate salt from acid in embodiments that contain an effervescent component.

In some embodiments, the colorant is capable of being inserted into toilets, either before or after use to sanitize or control odors. This includes toilets found in all settings with and without water holding tanks. In other embodiments, the invention may also be used to sanitize or control odor in waste water systems.

Odor control may be achieved through embodiments of the present invention that contain effervescent and fragrance components. In these embodiments, odor control is related, at least in part, to the formation of carbon dioxide gas. That is, some malodors have high molecular weights and therefore cannot rise to the surface of an aqueous environment to escape into the atmosphere before carbon dioxide, while other malodors have low molecular weights and escape into the environment before carbon dioxide. In embodiments of the present invention that emit carbon dioxide, odors with high molecular weights are suppressed. Odors with low molecular weights, on the other hand, may be controlled by embodiments of the present invention that comprise a fragrance. The presence of the fragrance helps mask odors as they rise to the surface of the toilet water and after they are released into the environment.

In other aspects, the various forms of the colorant may be contained in a clear reagent vessel. A reagent vessel is capable of containing or holding the effervescent of the present invention. For example, the reagent vessel may be a sealed pouch, dissolvable in water. In such embodiments, the reagent vessel may be constructed from a permeable filter paper-like material (e.g. the material used in tea bags). This type of material permits the components to leave the reagent vessel after insertion into the toilet so that the components may react with the toilet water.

In other embodiments, the reagent vessel may be constructed of clear plastic or any other type of material that will hold the effervescent before insertion into a toilet. Such materials include, but are not limited to polyethylene, polypropylene, polystyrene and polyethylene-terephtalate. In these embodiments, the reagent vessel may be discarded after insertion of the colorant into the toilet. For instance, the various forms of the colorant may be packaged in single use packages, which may be carried in one's purse or pocket. When using a public restroom or a friend's bathroom, the user may open the package containing the colorant, and dispense the contents into the toilet.

In still other embodiments, a dispensing apparatus for delivering the colorant of the present invention into a toilet may be employed. The dispensing apparatus may, for example, be attached to any solid surface on or above a toilet and may comprise a container connected to a tube or other device for delivering the colorant from the container into the toilet bowl. The dispensing apparatus may be operated by depressing a button or any other suitable means that will dispense appropriate amounts of colorant into the toilet bowl.

The present invention is illustrated, but in no way limited by the following examples, in which added constituents are reflected in terms of percent addition, with any unaccounted-for remainder comprising inert ingredients:

EXAMPLES 1a–b

Ex. 1a: 0.0005% Nitro Fast Red A 4B® was pre-mixed with 3.0% of a Citrus Fresh fragrance containing diethyl phthalate, a non-hygroscopic solvent. This mixture was then placed into to a ribbon blender. 40.0% sodium bicarbonate was added to the ribbon blender, and blended until the color was uniformly mixed with the sodium bicarbonate. Next, 1.0% of sodium lauryl sulfonate was added, followed by blending until the mixture appeared substantially homogeneous. 40.0% anhydrous citric acid was then added and also blended until substantially homogeneous. Finally, 0.0025% acid blue # 9 was added, with additional blending until the entire mixture was substantially homogeneous.

Ex. 1b: 0.0005% of Sandoplast Green G® was pre-mixed with 3.0% of an Evergreen fragrance containing isopropyl myristate. This mixture was then placed into to a ribbon blender. 40.0% sodium bicarbonate was added to the ribbon blender, and blended until the color was uniformly mixed with the sodium bicarbonate. Next, 1.0% sodium alpha olefin sulfonate was added to the blender, followed by blending until the mixture appeared substantially homogeneous. 40.0% of an anhydrous citric acid and tartaric acid mix was then added, and also blended until substantially homogeneous. Finally, 0.0025% Basacid Blue NB® was added, with additional blending until the entire mixture was substantially homogeneous.

The final formulations of Examples 1a–b were tested by observing them at room temperature for premature color changes, and then inserting them into an aqueous environment. Neither of the formulations changed color until they contacted the aqueous environment.

Comparative Example 0.0005% Nitro Fast Red A 4B® was pre-mixed with 3.0% of an Evergreen fragrance containing diethylene glycol monomethyl ether, a hygroscopic solvent. This mixture was then placed into a ribbon blender. 40.0% sodium bicarbonate was added to the ribbon blender, and blended until the color was uniformly mixed with the sodium bicarbonate. Next, 1.0% sodium alpha olefin sulfonate was added to the blender, followed by blending until the mixture appeared substantially homogeneous. 40.0% of an anhydrous citric acid and tartaric acid mix was then added, and also blended until homogeneous. Finally, 0.0025% FD&C Blue #1, which contains water of hydration, was added with additional blending until the entire mixture was substantially homogeneous.

This formulation was also tested by observing it at room temperature over time for premature color changes. In contrast to the formulations of Examples 1a–b, this formulation underwent a color change from red (the color exhibited by the oil-soluble dye) to purple and then blue (the color exhibited by the water-soluble dye) without contacting an aqueous environment.

Variations, modifications and other implementations of what is described herein will occur to those of ordinary skill in the art without departing from the spirit and scope of the invention. Accordingly, the invention is in no way limited by the preceding illustrative description.

I claim:

1. A colorant comprising a plurality of dyes, consisting of:
    a fragrance,
    an oil-soluble dye capable of exhibiting a first color when in a non-aqueous environment, said color being indicative of said fragrance, and
    a water-soluble dye capable of exhibiting a second color when in an aqueous environment;
    wherein the colorant exhibits the first color before introduction to an aqueous environment, and wherein the first color and at least a portion of the aqueous environment exhibit the second color when said colorant has been inserted into an aqueous environment.

2. The colorant of claim 1, further comprising an effervescent comprising an acid and a salt.

3. The colorant of claim 1, wherein the colorant is non-hygroscopic.

4. The colorant of claim 1, wherein the first color is selected from the group consisting of yellow, red, purple, orange and pink and the second color is selected from the group consisting of blue and green.

5. The colorant of claim 1, further comprising a surfactant.

6. The colorant of claim 1, further comprising an absorbing agent.

7. The colorant of claim 1, wherein the colorant is in tablet form.

8. The colorant of claim 1, wherein the aqueous environment is in a toilet bowl.

9. A process for treating water in a toilet bowl comprising:
    providing a composition comprising a colorant comprising a plurality of dyes, consisting of an oil-soluble dye capable of exhibiting a first color when in a non-aqueous environment, and a water-soluble dye capable of exhibiting a second color when in an aqueous environment; said composition further comprising at least one cleaning compound, wherein the composition exhibits said first color outside an aqueous environment; and
    placing the composition into an aqueous environment, wherein the first color and at least a portion of the aqueous environment exhibit said second color.

10. The process of claim 9, wherein the composition further comprises an effervescent.

11. The process of claim 10, wherein the effervescent comprises an acid and a salt.

12. The process of claim 9, wherein the colorant comprises an oil-soluble dye and a water-soluble dye that are mixed.

13. The process of claim 9, wherein the first color is selected from the group consisting of yellow, red, purple, orange and pink and the second color is selected from the group consisting of blue and green.

14. The process of claim 9, wherein the composition comprises a fragrance and said first color is indicative of said fragrance.

15. The process of claim 9, wherein the composition comprises a surfactant.

16. The process of claim 9, wherein the composition comprises an absorbing agent.

17. The process of claim 9, further comprising placing the composition in a reagent vessel.

18. The process of claim 9, wherein the composition is in tablet form.

19. A process for making a colored composition useful for cleaning comprising:
    providing an oil-soluble dye capable of exhibiting a first color in the absence of an aqueous environment;
    providing a water-soluble dye capable of exhibiting a second color in an aqueous environment; and
    mixing the oil-soluble dye and the water-soluble dye with a cleaning material and an effervescent material comprising an acid and a salt
    and pressing the composition into a tablet.

20. The process of claim 19, wherein the first color is selected from the group consisting of yellow, red, purple, orange and pink and the second color is selected from the group consisting of blue and green.

21. The process of claim 19, further comprising providing a fragrance.

22. The process of claim 19, further comprising providing a non-hygroscopic compound.

23. The process of claim 19, further comprising providing an absorbing agent.

* * * * *